United States Patent
Mainini et al.

(10) Patent No.: US 8,011,327 B2
(45) Date of Patent: Sep. 6, 2011

(54) VARIABLE VOLTAGE ELECTRONIC PET TRAINING APPARATUS

(75) Inventors: Christopher E. Mainini, Knoxville, TN (US); Albert L. Lee, IV, Seymour, TN (US); Steven L. Lawrence, Johnson City, TN (US)

(73) Assignee: Radio Systems Corporation, Knoxville, TN (US)

( * ) Notice: Subject to any disclaimer, the term of this patent is extended or adjusted under 35 U.S.C. 154(b) by 889 days.

(21) Appl. No.: 11/386,414

(22) Filed: Mar. 22, 2006

(65) Prior Publication Data

US 2007/0221138 A1 Sep. 27, 2007

(51) Int. Cl.
*A01K 15/02* (2006.01)
*A01K 27/00* (2006.01)

(52) U.S. Cl. ........................ 119/720; 119/859

(58) Field of Classification Search .................. 119/712, 119/718–720, 859, 908
See application file for complete search history.

(56) References Cited

U.S. PATENT DOCUMENTS

| | | | |
|---|---|---|---|
| 4,802,482 A | 2/1989 | Gonda et al. | |
| 5,054,428 A | 10/1991 | Farkus | |
| 5,666,908 A | 9/1997 | So | |
| 6,079,367 A | 6/2000 | Stapelfeld et al. | |
| 6,166,643 A | 12/2000 | Janning et al. | |
| 6,327,999 B1 | 12/2001 | Gerig | |
| 6,598,563 B2 | 7/2003 | Kim et al. | |
| 6,928,958 B2 | 8/2005 | Crist et al. | |
| 2006/0092676 A1* | 5/2006 | Liptak et al. | 363/56.02 |
| 2006/0102101 A1 | 5/2006 | Kim | |

OTHER PUBLICATIONS

Hayt, Jr., Engineering Circuit Analysis, 4th Ed., p. 438 (McGraw-Hill 1986).

* cited by examiner

*Primary Examiner* — Son T Nguyen

(74) *Attorney, Agent, or Firm* — Pitts, Lake & Bell, P.C.

(57) ABSTRACT

A variable voltage electronic pet training apparatus. The variable voltage electronic pet training apparatus controls the intensity of the stimulation by the controlling the voltage level present at the primary side of the transformer while maintaining a fixed signal to the correction pulse switch. A trigger signal contains information about the desired stimulus intensity level. A controller interprets the trigger signal and produces a voltage control signal associated with the desired energy level. Application of the voltage control signal to a power converter keeps the voltage level applied to an energy storage capacitor sufficient to produce the desired stimulation intensity.

23 Claims, 4 Drawing Sheets

VARIABLE VOLTAGE ELECTRONIC PET TRAINING APPARATUS

CROSS-REFERENCE TO RELATED APPLICATIONS

Not Applicable

STATEMENT REGARDING FEDERALLY-SPONSORED RESEARCH OR DEVELOPMENT

Not Applicable

BACKGROUND OF THE INVENTION

1. Field of Invention

The invention relates to an electronic animal training apparatus. More specifically, this invention relates to an electronic animal training apparatus using variable voltage stimulation.

2. Description of the Related Art

Pet correction collars using multiple corrective stimulation levels require both a method for controlling the stimulation level and when the stimulation is applied. Collar designs that are physically smaller and use lower operating voltages are no longer candidates for the use of traditional circuit topologies and components.

Present implementations control the level of stimulation delivered by controlling the current, or activation level, or pulse width of the stimulation activation switch while maintaining a constant voltage to the primary of the high-voltage transformer. For example, U.S. Pat. No. 5,666,908, titled "Animal Training Device," issued to So on Sep. 16, 1997, discloses an animal training device that applies different levels of electrical stimulation to an animal by varying a pulse width. The electrical stimulation is generated by applying a series of pulses to a switch connected to a transformer, which has its secondary connected to electrodes that contact the animal. The pulses have a constant voltage level at a fixed frequency; however, the pulse widths vary based on the desired stimulation to be applied. Because the secondary voltage is directly related to the pulse width, the electrical stimulation applied to the animal varies as the voltage varies. The lowest level of stimulation is produced with narrow pulse widths resulting in a lower voltage of electrical stimulation applied to the animal. The highest level of stimulation is produced with wide pulse widths resulting in higher voltage of electrical stimulation.

Another example is the device disclosed in U.S. Pat. No. 4,802,482, titled "Method and Apparatus for Remote Control of Animal Training Stimulus," issued to Gonda, et al., on Feb. 7, 1989. The Gonda device uses trains of pulses applied to the switch connected to the transformer. The Gonda device varies the stimulation intensity by varying the frequency of the pulses in the pulse train. The pulse train includes pulses having a fixed voltage and pulse width; however, the period between pulses is variable. The electrical stimulation applied to the animal is at a fixed voltage. The level of stimulation varies with the number of electrical stimulation signals applied to the animal per second. The lowest level of stimulation is produced by a pulse train with a low pulse frequency resulting in fewer electrical stimulation shocks per second. The highest level of stimulation is produced by a pulse train having a high pulse frequency resulting in more electrical stimulation shocks per second. The duration of the stimulation to the animal is controlled by the operator of the Gonda device.

A still another example is the device disclosed in U.S. Pat. No. 5,054,428, titled "Method and Apparatus for Remote Conditioned Cue Control of Animal Training Stimulus," issued to Farkus on Oct. 8, 1991. The Farkus device varies the stimulation intensity applied to the animal by varying the length of the pulse train applied to the switch connected to the transformer. The pulse train includes pulses having a fixed voltage and pulse width, and the pulses have a fixed frequency. The electrical stimulation applied to the animal is at a fixed voltage. The level of stimulation varies with the duration of the stimulation to the animal. The lowest level of stimulation is produced with a pulse train having a single pulse and a short duration. The highest level of stimulation is produced by a pulse train that includes approximately 64 pulses, which results in a longer duration stimulation being applied to the animal.

BRIEF SUMMARY OF THE INVENTION

The variable voltage electronic pet training apparatus includes a power supply in electrical communication with a voltage regulator. The voltage regulator provides a stable, regulated voltage to the controller. The controller generally controls the operation of the variable voltage electronic pet training apparatus based upon the imbedded control program. A power converter, a peak hold detector, a correction pulse switch, and an energy recovery circuit are in electrical communication with the controller. The power converter charges an energy storage capacitor. The controller sets the output voltage of the power converter. The optional peak hold detector tracks output of the power converter and keeps the maximum amplitude as a peak voltage on the energy storage capacitor. Feedback from the peak hold detector goes to the controller to allow the voltage of the power converter to be maintained at the desired level. An optional energy recovery circuit provides the ability to recover unspent energy from the energy storage capacitor. The controller drives the correction pulse switch and determines when the charge stored by the energy storage capacitor is applied to the primary of a transformer. When charge is applied to the primary transformer, the resulting voltage at the secondary is transferred to the animal through a pair of electrodes. A trigger circuit in communication with the controller is responsible for setting the desired intensity of the correction stimulus. The stimulus intensity is either set manually or automatically depending on the application.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A variable voltage electronic pet training apparatus is identified by the element number 100 in the text and the accompanying figures. The variable voltage electronic pet training apparatus controls the intensity of the stimulation by the controlling the voltage level present at the primary side of the transformer while maintaining a fixed control signal to the correction pulse switch. A trigger signal contains information about the desired stimulus intensity level. A controller interprets the trigger signal and produces a voltage control signal associated with the desired energy level. Application of the voltage control signal to a power converter keeps the voltage level applied to an energy storage capacitor sufficient to produce the desired stimulation intensity.

Figure 1:
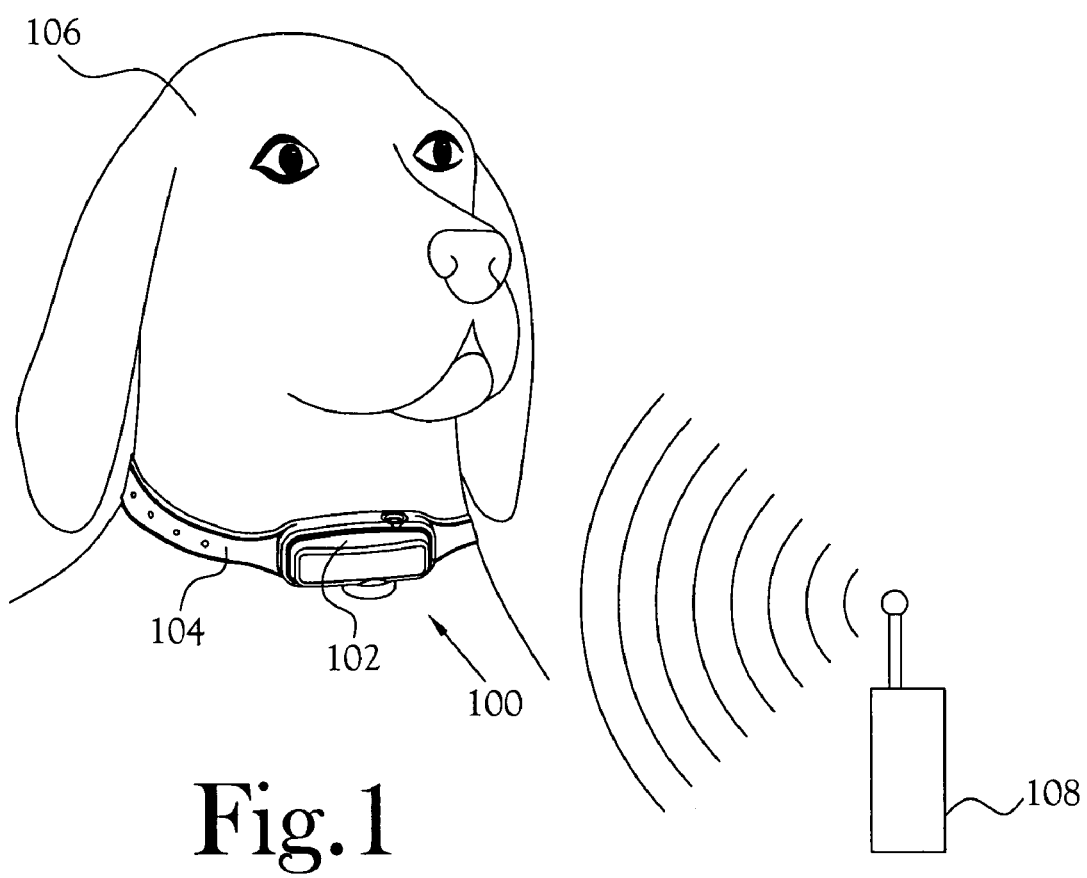
FIG. 1 is an illustration of an electronic animal training apparatus according to the present invention.

FIG. 1 is an illustration of one embodiment of the variable voltage electronic pet training apparatus 100. The variable voltage electronic pet training apparatus 100 includes an electronic training device 102 carried on a collar 104 worn by an animal 106 and a transmitter 108 that is in communication with the electronic training device 102. The variable voltage electronic pet training apparatus 100 is designed to deliver a mild electrical correction stimulus to the animal for the purpose of training or containment. The variable voltage electronic pet training apparatus 100 of the present invention provides the ability to alter the intensity of the correction stimulus based on a signal broadcast from the transmitter 108.

One skilled in the art will recognize that the present invention has applicable in most electronic animal training and containment systems, including bark control systems, remote training systems, and electronic containment fence systems. Further, although typically worn on a collar around the neck of the animal, one skilled in the art will recognize that the variable voltage electronic pet training apparatus 100 can be worn on a strap or harness around other portions of the animal.

Figure 2:
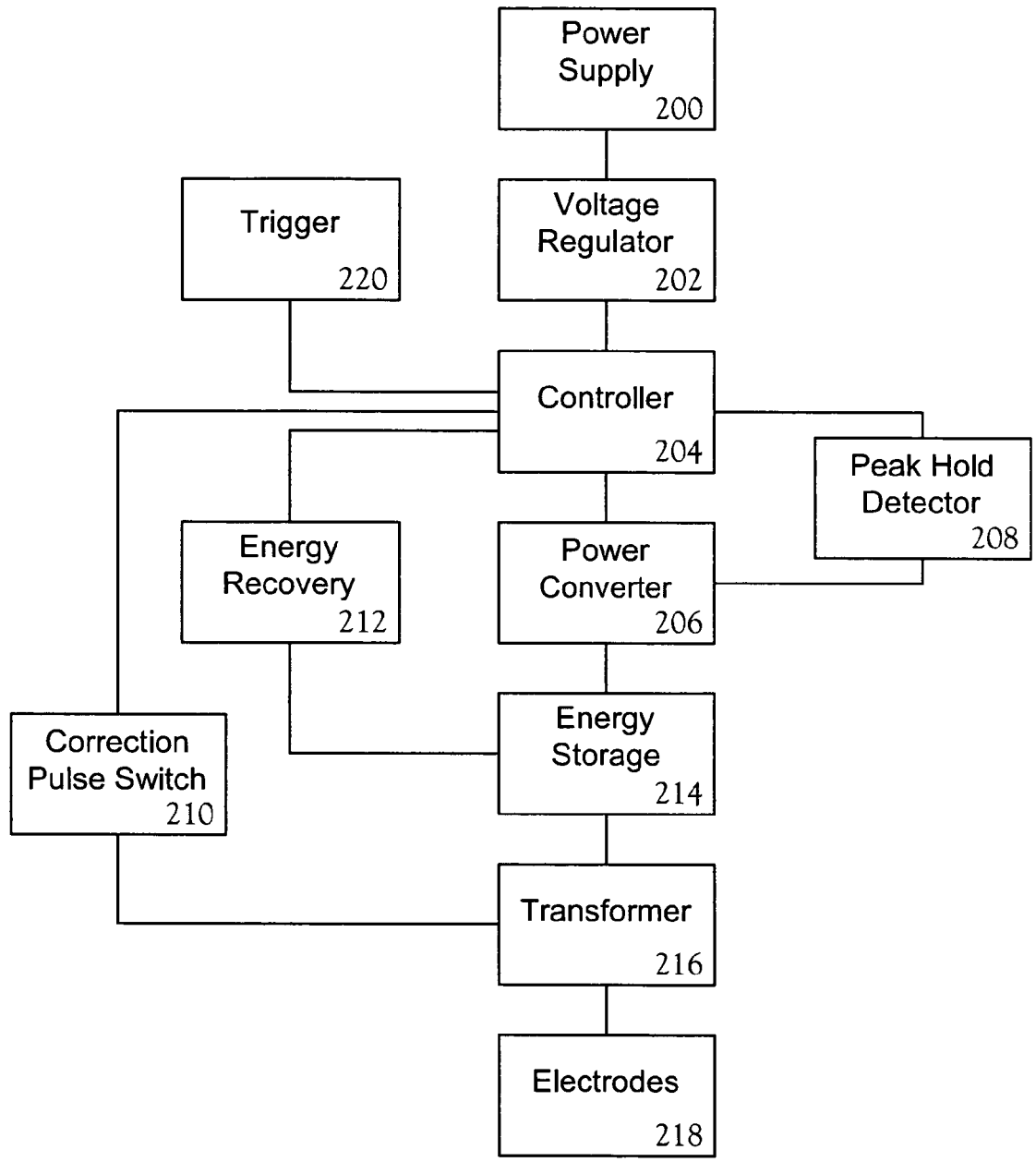
FIG. 2 is a block diagram of one embodiment of the electronic animal training apparatus.

FIG. 2 is a block diagram of the variable voltage electronic pet training apparatus 100. The variable voltage electronic pet training apparatus 100 includes a power supply 200 in electrical communication with a voltage regulator 202. The voltage regulator 202 provides a stable, regulated voltage to the controller 204. The controller 204 generally controls the operation of the variable voltage electronic pet training apparatus 100 based upon the imbedded control program. One skilled in the art will recognize that various control devices are available to implement the controller and will be selected based upon availability and desired functionality.

A power converter 206, a peak hold detector 208, a correction pulse switch 210, and an energy recovery circuit 212 are in electrical communication with the controller 204. The power converter 206 charges an energy storage (correction) capacitor 214. The controller 204 sets the output voltage of the power converter 206. The optional peak hold detector 208 tracks output of the power converter 206 and keeps the maximum amplitude as a peak voltage on the energy storage capacitor 214. Feedback from the peak hold detector 208 goes to the controller to allow the voltage of the power converter 206 to be maintained at the desired level. An optional energy recovery circuit 212 provides the ability to recover unspent energy from the energy storage capacitor 214. The controller 204 drives the correction pulse switch 210 and determines when the charge stored by the energy storage capacitor is applied to the primary of a high voltage transformer 216. When charge is applied to the primary of the transformer 216, the resulting voltage at the secondary is transferred to the animal through a pair of electrodes 218. The resulting stimulus intensity is directly related to the voltage differential across the primary of the transformer 216 when the correction pulse switch 210 is activated with a fixed activation signal, i.e., an activation signal that does not vary in frequency, amplitude, or duration. In another embodiment, the activation signal applied to the correction pulse switch 210 is a pulse train or similarly modified signal that allows precise control of the ON/OFF time for correction pulse switch 210 and allows improved efficiency when combined with the variable voltage technique of the present invention but is not necessary as the stimulus intensity is controlled by varying the voltage applied to the transformer.

One skilled in the art will appreciate that the correction pulse switch 210 is, generally, any device that can be controlled to efficiently turn on and off the application of a voltage to the primary of the transformer and is electrically sized for the voltage and current requirements. In certain embodiments, it is desirable for the correction pulse switch 210 to be a device responsive enough to allow rapid changes to the ON/OFF state so that precise control of the ON/OFF time can be achieved. In this regard, the correction pulse switch may include one or multiple devices, which may be a discrete device (e.g., transistor, relay, etc) or a monolithic integrated device. The location of the correction pulse switch may be on either the source (high) or sink (low) side of the primary. The operation of the correction pulse switch may be as a discrete ON/OFF control or may include some other characteristic such as current limiting. The correction pulse switch control signal characteristics are matched with the correction pulse switch to produce the appropriate stimulation waveform desired.

One skilled in the art will also appreciate that the power converter is any device that produces an output voltage by modifying the input voltage in such a manner that is corresponds to the characteristic of a power converter control signal. The power converter may be a discrete device, a monolithic integrated device such as an adjustable linear regulator or a switch-mode regulator that can attenuate or boost the input voltage to the desired voltage level. The variable voltage electronic pet training apparatus 100 uses the power converter control signal to create an appropriate control signal for the power converter to set the output voltage applied to the primary of the high-voltage transformer to produce the desired energy delivered to the secondary of the high voltage transformer, to the electrodes, and, ultimately, to the animal. The power converter control signal may be analog or digital, but is an appropriate signal to stimulate the power converter.

Finally, FIG. 2 includes a trigger circuit 220 in communication with the controller 204. In general, the trigger circuit 220 is responsible for setting the desired intensity of the correction stimulus. The trigger circuit produces one or more signals that trigger a response by the controller 204 causing a correction stimulus of a desired intensity to be produced. The signals produced by the trigger circuit can be generically referred to a stimulus request. In one embodiment, the stimulus request is a single coded signal that serves as both the request for a correction stimulus and a carrier for the stimulus intensity level information used by the controller. In another embodiment, the stimulus request initiates the generation of a correction stimulus by the controller and the controller reads the stimulus intensity level from an external selector or a memory location as part of the correction stimulus generation process. In yet another embodiment, the stimulus request includes two or more signals where one signal serves as the stimulus request and the other is a signal carrying stimulus intensity information to the controller. One skilled in the art should recognize other ways of communicating the necessary information to the controller without departing from the scope and spirit of the present invention.

The stimulus intensity is either set manually or automatically depending on the application. Trainers, both professional and amateur, often use handheld remote units that give the trainer manual control over the stimulus applied to the animal. Depending upon the implementation, the remote units allow the trainer to select the type, duration, and intensity of the stimulus using a coded signal that is often transmitted by a radio frequency (RF) signal.

Unattended electronic training devices, such as bark control collars, often automatically adjust the stimulus intensity based upon the response of the animal. Such devices typically generate the stimulus request locally (i.e., internal to the stimulus unit). Generation of an automatically-varied stimulus intensity is application specific and such techniques are known to those skilled in the art.

Finally, other devices may use a combination of automatic and/or manual intensity adjustment and remote and/or local adjustment. Consider an electronic animal confinement system used with multiple animals having a remote transmitter and stimulus units worn by each of the pets. The remote transmitter may include selectors allowing the type and/or intensity of the stimulus to be set on a global level. The stimulus units may contain additional selectors that override or modify the global setting allowing the intensity to be adjusted to the needs of the particular animal. Further, the stimulus units may contain additional programming that adjusts the stimulus intensity based on the actions of the animal. Certainly, one skilled in the art will recognize that these exemplary devices do not cover all permutations of the control over the stimulus intensity known in the pet product industry and that various combinations and modifications in the stimulus intensity control remain within the scope and spirit of the present invention.

Figure 3:
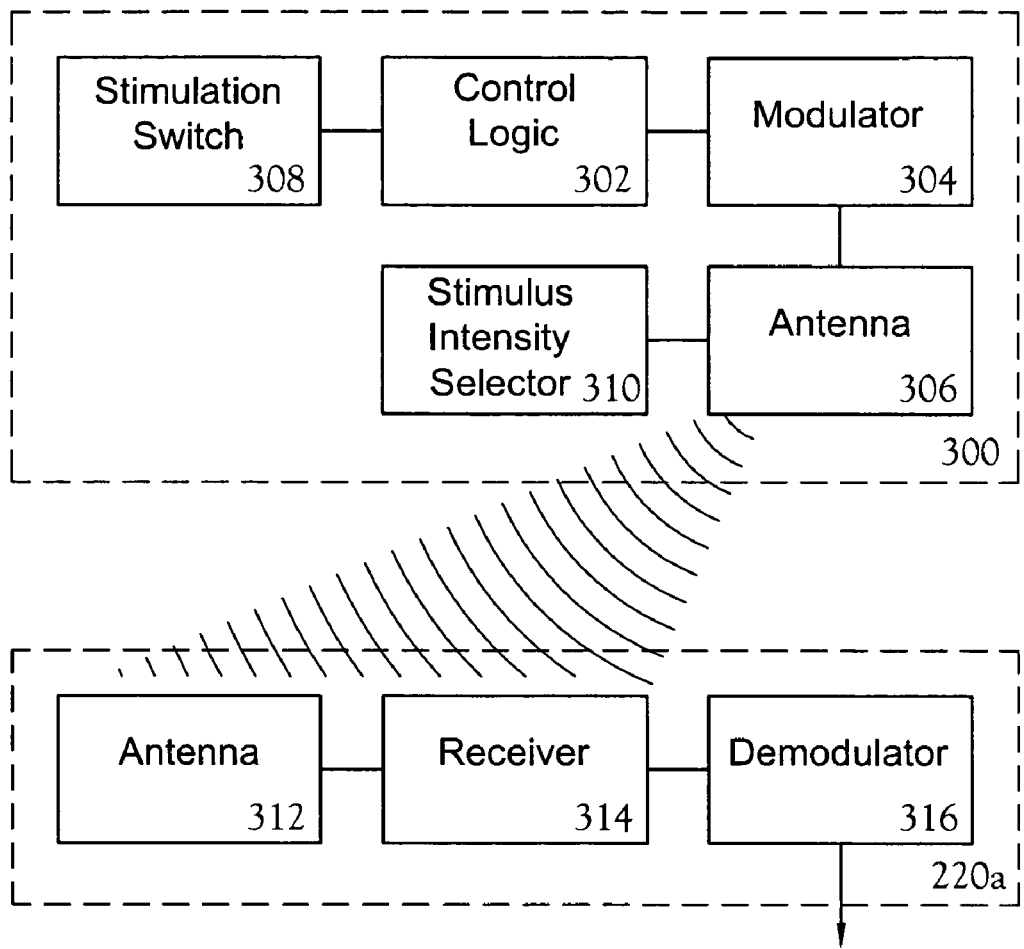
FIG. 3 is a block diagram of one embodiment of a trigger circuit (remote)

FIG. 3 illustrates a block diagram of one embodiment of a remote transmitter 300 in communication with the corresponding trigger circuit 220a. The remote transmitter 300 includes a controller 302, a modulator 304, an antenna 306, a stimulation switch 308, and a stimulus intensity selector 310, which is typically a switch or other adjustment mechanism. The controller 302 is responsive to the activation of the stimulation switch 308 and reads the current value of the stimulus intensity selector 310. The stimulus intensity value is coded into a signal that is modulated by modulator 304 and transmitted by antenna 306. In this embodiment, the trigger circuit 220a includes an antenna 312, a receiver circuit 314 attuned to the transmitter frequency, and a demodulator 316. The coded signal received by the receiver circuit 314 is demodulated by demodulator 316 and passed to the controller 204. The controller 204 reads the stimulus intensity value and adjusts the power converter drive signal to provide the desired output voltage. When the desired output voltage is available, the controller 204 sends the correction pulse control signal to the correction pulse switch 210 and creates the potential across the primary of the transformer 216. The potential across the primary of the transformer 216 determines the intensity of the correction stimulus. Thus, by controlling the voltage, the controller 204 cause the desired stimulus intensity selected at the remote transmitter 300 to be applied to the animal 108.

While the block diagram of FIG. 3 has been described in terms of an RF transmitter/receiver pair, other embodiments are contemplated. Exemplary functions performed using wireless communications include establishing a boundary, initiating the application of a stimulus, and modifying settings of the stimulation unit. Commonly used wireless communication technologies include RF communications, infrared and other optical communication, and magnetic/electromagnetic field communication. One skilled in the art will recognize that wireless communication technologies evolve and would not consider the current invention limited to the wireless communication technologies or the exemplary uses disclosed herein.

Figure 4:
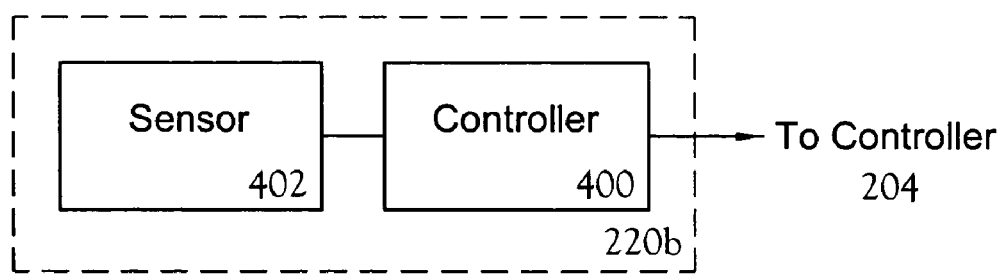
FIG. 4 is a block diagram of another embodiment of a trigger circuit (local)

FIG. 4 illustrates a block diagram of another embodiment of a local trigger circuit 220b. The local trigger circuit 220b generates a stimulus request locally. The local trigger circuit 220b includes a controller 400 in communication with a sensor 402 that monitors a condition of or in the vicinity of the animal wearing the stimulus unit. In one embodiment, the sensor 402 is a bark detection circuit including a microphone and/or a vibration sensor. The controller 400 evaluates the monitored condition reported by the sensor 402 and determines whether a stimulus request is warranted.

In one embodiment, the controller 400 further evaluates the monitored condition in view of additional criteria (e.g., historical barking patterns and/or length of current bark episode) and adjusts the stimulus intensity automatically. In another embodiment, the stimulus intensity can be manually selected by adding a stimulus intensity selector as described with respect to FIG. 3. Further embodiments allow the manual selection of the base stimulus intensity with automatic adjustment of the stimulus intensity by controller in response to monitored conditions.

Although indicated as a separate part of the local trigger circuit 220b, it is contemplated that the controller 400 can be implemented as an additional function in the controller 204 previously described in some embodiments. Further, commonly used monitoring technologies include sound wave detection, vibration detection, and environmental or physiological condition detection. One skilled in the art will recognize that a wide selection of monitoring technologies exists and that monitoring technologies evolve and would not consider the current invention limited to the monitoring technologies or the exemplary uses disclosed herein.

Finally, it should be appreciated by one skilled in the art that a combination of the structures and techniques described in relation to FIGS. 3 and 4 may be used. The implementation of a trigger circuit is application specific and, in relation to the present invention, is considered to be common knowledge to one skilled in the art or can be readily ascertained from numerous reference sources.

Figure 5:
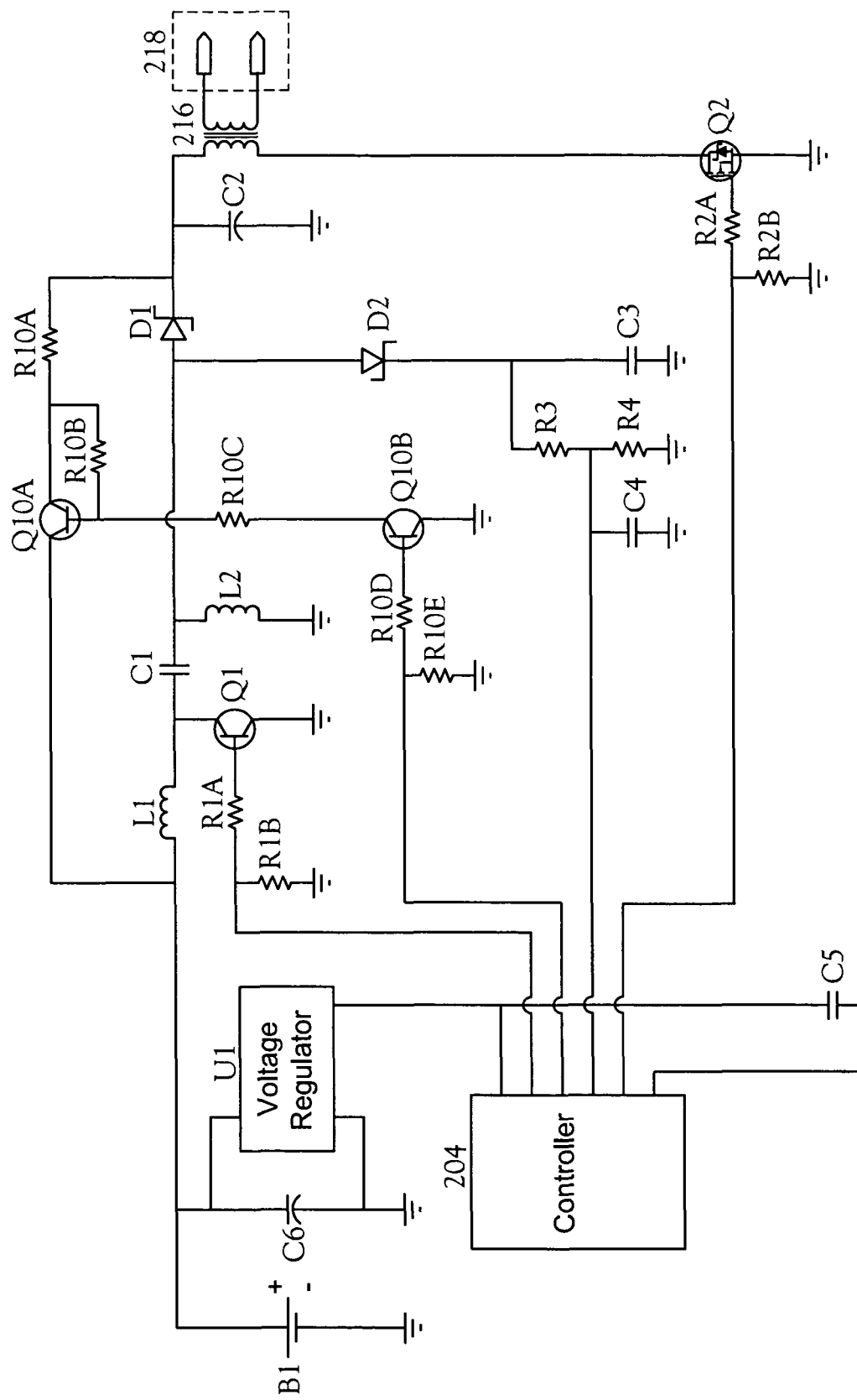
FIG. 5 is a schematic diagram of one embodiment of the electronic animal training apparatus.

FIG. 5 is a schematic diagram of one embodiment of the variable voltage electronic pet training apparatus 100. The power source 200 is represented by battery B1. Battery B1 directly feeds the voltage regulator 202, which includes regulator U1 and capacitors C5 and C6 in the illustrated embodiment. The regulated voltage provides a stable regulated voltage for the controller 204, which in the illustrated embodiment is a microcontroller. The microcontroller interfaces to all devices through its input/output port pins under the control of the embedded application firmware. In one embodiment, the microcontroller has both digital and analog circuitry including analog comparators and a pulse-width modulation output. These and other features are advantageous for the illustrated embodiment because they reduce the number of components needed. One skilled in the art will recognize that other types of controllers can be used. Less feature-laden controllers will necessarily the addition of supplemental components desired for the specific implementation, such as a comparator circuit or a modulation circuit.

One output of the controller is the power converter drive signal that drives the gate of transistor Q1 biased by resistors R1A and R1B. The power converter drive signal is a pulse-width modulated signal that controls corresponds to the desired output voltage. Transistor Q1 controls the power converter 206, which includes inductor L1, capacitor C1, inductor L2, and breakdown diode D1 in the illustrated embodiment. The illustrated power converter 206 is a single-ended primary inductance converter (SEPIC). SEPIC topologies are useful because the output voltage can be higher or lower than the battery voltage and are well-suited for use with lithium batteries. However, one skilled in the art will recognize that other power converter circuits can be used without departing from the scope and spirit of the present invention.

The output of the power converter 206 at breakdown diode D1 charges the energy storage capacitor C2. The voltage variation to C2 determines the correction energy provided. The controller 204 sends a signal to the gate of the correction pulse switch transistor Q2, which is biased by resistors R2A and R2B. In one embodiment, the activation signal applied to the gate of the correction pulse switch transistor Q2 is a fixed output that does not vary in duration, frequency, or amplitude. Thus, the stimulus intensity is related directly to the output voltage of the power converter 206 when the correction pulse switch 210 is activated. The high-voltage transformer 216 steps up the voltage across the primary and transfers the secondary voltage to the animal through electrodes 218 to produce a correction stimulus.

Turning to the activation signal in greater detail, one embodiment of the activation signal is a constant voltage. In other embodiments, the activation signal is a pulse train but not a variable pulse train. A pulse train is a series of pulses used to control the correction pulse switch. Typical pulse train sequences include one OFF-ON-OFF pulse or a series of OFF-ON-OFF transitions with predetermined OFF and ON periods. The ON and OFF periods do not have to be equal and the number of pulse trains can be one or several. The activation signal (i.e., the pulse trains) does not vary with the selected intensity level and is not used to control the stimulus intensity. Stimulus intensity remains a function of the voltage applied to the transformer using the voltage variation techniques described herein.

Another embodiment has predetermined activation signals for each intensity level to attempt to optimize the energy transfer efficiency, i.e., to better match the power converter and energy storage circuitry with the transformer. The stimulus intensity remains tied to the voltage applied to the transformer using the voltage variation techniques described herein. Only the efficiency of the energy transfer is adjusted by having customized activation signals for each correction level. For example, if the correction pulse control signal is set to three pulse trains of eight pulses with a fixed ON-OFF periods for the highest intensity, a lower intensity setting with a lower voltage applied to the transformer might have two pulse trains of eight pulses to improve the energy transfer efficiency at the lower voltage. By improving the energy transfer efficiency battery life is improved, i.e., power is not wasted through inefficient activation of the correction pulse switch.

In another embodiment, the varying signal that switches the correction pulse switch transistor Q2 on and off to control the amount of charge applied to the transformer through a combination of the variable voltage output of the power converter 206 and the frequency or duration of the activation signal applied to the correction pulse switch 210. By varying the activation signal, the efficiency of the correction stimulus is changed. In one embodiment, the transformer is a pulse transformer and the activation signal is varied in both the number of pulses in the signal and the pulse width. Generally, a greater number of pulses and wider pulse widths keep the correction pulse switch 210 active longer resulting in a more intense correction stimulus because more energy is applied to the primary of the pulse transformer.

In the illustrated embodiment, the power converter 206 is located on the high side of the transformer 216 and the low side of the transformer 216 is connected to ground through the correction pulse switch 210. This arrangement allows the output voltage of the power converter to increase the potential across the primary of the transformer up to the battery voltage (or beyond using SEPIC topologies). One skilled in the art will appreciate other implementations that allow the potential across the primary of the transformer to be controlled. For example, in another embodiment, the high side of the transformer is connected to the battery voltage through the correction pulse switch and the low side of the transformer is connected to the power converter. This arrangement allows the output voltage of the power converter to reduce the potential across the primary of the transformer by raising the voltage on the low side of the transformer and reducing the potential across the primary of the transformer. In yet another embodiment, a first power converter is connected to the high side of the transformer and a second power converter to the low side of the transformer. By adjusting either or both of the first and second power converters, the potential across the primary of the transformer is varied. In a still further embodiment, the correction pulse switch is connected between the power converter and the primary of the transformer.

The output of the power converter 206 before breakdown diode D1 charges the peak hold detector 208, which includes capacitor C3, the voltage divider made up of resistors R3 and R4, and a noise filter capacitor C4. In the illustrated embodiment, the voltage divider connects to the comparator input of the microcontroller to provide feedback allowing microcontroller to adjust and regulate the power converter 206 and maintain a desired voltage.

The energy recovery circuit 212 includes transistors Q10A and Q10B and biasing resistors R10A, R10B, R10C, R10D, and R10E. The energy recovery circuit 212 provides the ability to recover unspent energy from the energy storage capacitor C2, which extends battery life.

In operation, for example with the trigger circuit of FIG. 3, the setting of the output voltage is controlled by the operation of the transmitter. One of several levels can be selected by the user. When the correction button is pressed, the value of the correction level is sent to the receiver, which decodes and verifies the proper signal and data format. The controller translates the correction level selected to a predetermined equivalent voltage. The desired voltage is generated by the voltage converter and presented to the correction capacitor. When the proper voltage is established, the correction pulse switch is turned on to deliver the correction.

It should be appreciated that FIG. 5 represents one specific implementation of the general circuit described in the block diagram of FIG. 2. One skilled in the art will appreciate the differing implementations that can be achieved through the substitution of parts and subcircuits without departing from the scope and spirit of the present invention. The differing implementations reflect design choices by one skilled in the art.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

The invention claimed is:

1. A variable voltage electronic pet training apparatus comprising:
    a controller producing a correction pulse switch activation signal, said controller producing a power converter drive signal corresponding to a selected stimulus intensity;

a power converter in communication with said controller, said power converter producing a first voltage corresponding to said power converter drive signal;

a transformer having a primary and a secondary, said primary in communication with said power converter, said secondary having an output representing a correction stimulus at said selected stimulus intensity;

a correction pulse switch in communication with said controller, said correction pulse switch in communication with said primary, said correction pulse switch selectively connecting said primary to one of said first voltage and a second voltage and producing a primary voltage across said primary equal to the difference between said first voltage and said second voltage wherein said correction stimulus is controlled by adjusting said primary voltage as a result of varying said first voltage using said power converter; and a pair of electrodes connected to said secondary, said pair of electrodes transferring said correction stimulus to an animal.

2. The variable voltage electronic pet training apparatus of claim 1 wherein said transformer is in switched communication with said power converter.

3. The variable voltage electronic pet training apparatus of claim 2 wherein said correction pulse switch selectively connects said first voltage and said primary.

4. The variable voltage electronic pet training apparatus of claim 1 wherein said correction pulse switch selectively connects said second voltage and said primary.

5. The variable voltage electronic pet training apparatus of claim 1 further comprising a second power converter in communication with said controller, said second power converter producing said second voltage in response to a second power converter drive signal produced by said controller.

6. The variable voltage electronic pet training apparatus of claim 1 wherein said second voltage is a voltage selected from the group consisting of a ground voltage and a supply voltage.

7. The variable voltage electronic pet training apparatus of claim 1 further comprising a peak hold detector in communication with said power converter and said controller, said peak hold detector providing feedback of said first voltage allowing said controller to adjust said power converter drive signal to maintain a selected said first voltage.

8. The variable voltage electronic pet training apparatus of claim 1 wherein said correction pulse switch activation signal is identical for each said selected stimulus intensity.

9. The variable voltage electronic pet training apparatus of claim 1 wherein said correction pulse switch activation signal varies based on said selected intensity to improve energy transfer efficiency between said power converter and said transformer.

10. The variable voltage electronic pet training apparatus of claim 1 wherein said power converter is a single-ended primary inductance converter.

11. The variable voltage electronic pet training apparatus of claim 1 further comprising an energy storage circuit in communication with said power converter and said transformer.

12. The variable voltage electronic pet training apparatus of claim 11 further comprising an energy recovery circuit in communication with said energy storage circuit and said controller.

13. The electronic animal training apparatus of claim 1 wherein said correction pulse switch activation signal does not vary with the selected intensity.

14. A variable voltage electronic pet training apparatus comprising:

a controller producing a correction pulse switch activation signal, said controller producing a power converter drive signal corresponding to a selected stimulus intensity;

a power converter in communication with said controller, said power converter producing a first voltage corresponding to said power converter drive signal;

a transformer having a primary and a secondary, said primary in communication with said power converter, said secondary having an output representing a correction stimulus at said selected stimulus intensity;

a correction pulse switch selectively completing a circuit including said power converter and said transformer wherein said first voltage is applied to one side of said primary and a second voltage is applied to the other side of said primary wherein said correction stimulus is controlled by adjusting the voltage across the primary as a result of varying said first voltage using said power converter; and a pair of electrodes connected to said secondary, said pair of electrodes transferring said correction stimulus to an animal.

15. The variable voltage electronic pet training apparatus of claim 14 further comprising a second power converter in communication with said controller, said second power converter producing said second voltage in response to a second power converter drive signal produced by said controller.

16. The variable voltage electronic pet training apparatus of claim 14 wherein said second voltage is a voltage selected from the group consisting of a ground voltage and a supply voltage.

17. The variable voltage electronic pet training apparatus of claim 14 further comprising a peak hold detector in communication with said power converter and said controller, said peak hold detector providing feedback of said first voltage allowing said controller to adjust said power converter drive signal to maintain a selected said first voltage.

18. The variable voltage electronic pet training apparatus of claim 14 wherein said correction pulse switch activation signal is identical for each said selected intensity.

19. The variable voltage electronic pet training apparatus of claim 14 wherein said correction pulse switch activation signal varies based on said selected intensity to improve energy transfer efficiency between said power converter and said transformer.

20. The variable voltage electronic pet training apparatus of claim 14 wherein said power converter is a single-ended primary inductance converter.

21. The variable voltage electronic pet training apparatus of claim 14 further comprising an energy storage circuit in communication with said power converter and said transformer.

22. The variable voltage electronic pet training apparatus of claim 21 further comprising an energy recovery circuit in communication with said energy storage circuit and said controller.

23. The electronic animal training apparatus of claim 14 wherein said correction pulse switch activation signal does not vary with the selected intensity.

* * * * *